United States Patent [19]
Ackerson

[11] Patent Number: 5,861,724
[45] Date of Patent: Jan. 19, 1999

[54] REGENARATIVE BRAKING APPARATUS AND METHOD FOR DIRECT CURRENT MOTORS

[75] Inventor: George L. Ackerson, Alamo, Calif.

[73] Assignee: Jefferson Programmed Power, LLC, Alameda, Calif.

[21] Appl. No.: 868,015

[22] Filed: Jun. 3, 1997

[51] Int. Cl.⁶ .................................................. H02P 3/14
[52] U.S. Cl. ...................... 318/376; 318/139; 364/426.01
[58] Field of Search ................... 318/376, 379, 318/258, 139, 294, 293, 561, 636, 135, 687, 433, 798, 369, 254; 364/426.01, 426.06, 149, 158; 180/179, 176, 165, 65.8, 65.4; 192/0.052, 0.076, 3.56, 21.5, 103 R; 303/3

[56] References Cited

U.S. PATENT DOCUMENTS

| | | |
|---|---|---|
| 3,728,599 | 4/1973 | Minami . |
| 3,828,233 | 8/1974 | Brulard . |
| 3,848,169 | 11/1974 | Asano et al. . |
| 4,092,577 | 5/1978 | Markham . |
| 4,095,157 | 6/1978 | Williamson . |
| 4,124,812 | 11/1978 | Naito et al. . |
| 4,186,333 | 1/1980 | Kremer . |
| 4,267,492 | 5/1981 | Manners ................................... 318/376 |
| 4,401,926 | 8/1983 | Morton et al. . |
| 4,408,293 | 10/1983 | Avins ....................................... 364/426 |
| 4,422,021 | 12/1983 | Schwarz . |
| 4,479,080 | 10/1984 | Lambert . |
| 4,730,151 | 3/1988 | Florey et al. . |
| 4,791,548 | 12/1988 | Yoshikawa et al. ..................... 364/149 |
| 4,880,094 | 11/1989 | Ohkumo ............................... 192/0.052 |
| 4,944,898 | 7/1990 | Wright . |
| 5,276,387 | 1/1994 | Gamble ................................ 192/0.052 |
| 5,332,954 | 7/1994 | Lankin . |
| 5,350,985 | 9/1994 | Konrad et al. . |
| 5,355,070 | 10/1994 | Cocconi .................................. 318/798 |
| 5,406,154 | 4/1995 | Kawaguchi et al. ..................... 310/67 R |
| 5,505,527 | 4/1996 | Gray, Jr. et al. ............................ 303/3 |
| 5,552,988 | 9/1996 | Kawaguchi et al. ............... 364/426.01 |
| 5,578,911 | 11/1996 | Carter ..................................... 318/139 |

*Primary Examiner*—Paul Ip
*Attorney, Agent, or Firm*—Crosby, Heafey, Roach & May

[57] ABSTRACT

A regenerative braking control apparatus for use with a motor driven by a D.C. power source. In response to a series of operating parameters, the control apparatus causes the motor to transition between a drive mode, a transient mode, a regulated current regenerative braking mode, and a constant PWM regenerative braking mode. In particular, the motor enters the drive mode in response to a request for an increase in speed, the motor enters the transient mode in response to a request for a decrease in speed, the motor enters the regulated current regenerative braking mode in response to a lapse of a predetermined time delay or in response to a request for a reduction in the magnitude of the previously requested decrease in speed, and the motor enters the PWM regenerative braking mode in response to a request to continue braking when the requested braking torque cannot be maintained.

24 Claims, 4 Drawing Sheets ns
REGENARATIVE BRAKING APPARATUS AND METHOD FOR DIRECT CURRENT MOTORS

FIELD OF THE INVENTION

The present invention relates generally to regenerative braking in an electric motor and, more specifically to transitioning from a motor's normal drive mode to a regenerative braking mode and to controlling regenerative braking once current is flowing through a regenerative braking circuit.

BACKGROUND OF THE INVENTION

Regenerative braking is the conversion of kinetic energy created by a system powered by a motor into electrical energy, and the storing of that electrical energy to power the motor.

Zapi Corporation of Italy manufactures direct current motor controllers using a regenerative braking circuit, as illustrated in FIG. 1. The essential element of the Zapi regenerative braking circuit is a single-pole, double-throw regenerative braking contactor 10. The regenerative braking contactor 10 is energized in drive mode. When energized, the regenerative braking contactor 10 allows current to flow from the positive terminal of battery 20 through armature winding 30, field winding 40, and motor drive FETs 50.

The regenerative braking contactor 10 is de-energized in braking mode. When the regenerative braking contactor is de-energized its contacts connect a top connector A1 of the armature winding 30 to the negative terminal of the battery 20. This connection enables regenerative braking.

While the Zapi circuit is somewhat effective, it may be utilized only under limited conditions. In fact, three conditions must be met in order for regenerative braking to occur: first, the motor field winding 40 must contain sufficient flux to induce an opposing current in the armature 30; second, the motor field winding 40 must be electrically connected such that the magnetic interaction of the armature 30 with the induced field generates a regenerative current (i.e., the direction contactors 42 and 44 must be reversed so the motor current flows in a direction that opposes the existing direction of motor rotation); and finally, a complete path for current flow must exist from the motor field winding 40 to the battery 20.

These conditions for operation make reversing the direction contactors 42 and 44 very difficult. For example, to switch from the forward driving direction to the reverse driving direction, the motor current must be off. Otherwise, if the direction contactors 42 and 44 are reversed while a substantial current is flowing through the motor, there is a danger the contactors will be welded in place. Moreover, even if the direction contactors 42 and 44 are successfully switched while current is flowing through the motor, the contactor switch times are generally longer than the time constant (the time required for flux dissipation) of high powered direct current motors. Thus, there will be little or no flux left in the field winding 40 after the contactors are reversed.

For regenerative braking to be safely induced using the available Zapi circuit, a secondary mechanism must be included for exciting the regenerative braking current in the armature 30. This is accomplished by using a weak magnetic field induced in the iron of the electric motor case (not shown). If a flux path is in the proper direction in relation to the magnetic field, a high rotational armature speed will cause a small current to begin to flow through the motor drive FETs 50. Once the flow of current is detected, it can be regulated through controlled pulse width modulation (PWM) at the motor drive FETs 50.

One primary disadvantage of the Zapi regenerative braking circuit is that high motor speed is required to initiate the regenerative braking current. The Zapi circuit requires a four-step process to begin regenerative braking:

1. Disengage forward contactor 42 and engage reverse contactor 44.
2. Initiate plug braking by turning on the motor drive FETs 50 to "set" the flux direction in the field winding 40.
3. Drop out the main contactor 10 to connect the negative terminal of the battery 20 to the top of the armature 30.
4. Monitor the circuit for initiation of a regenerative braking current and signal the motor drive FETs 50 to control the regenerative breaking current.

In short, the Zapi regenerative braking circuit depends upon a weak magnetic field in the iron of the motor case to excite the armature current for regenerative braking. This eliminates the possibility of using non-ferrous metals in the motor case. Even more importantly, the armature current can only be generated in the Zapi circuit if the speed of the armature is great enough to overcome the voltage drops of the active and passive components in the circuit. This may require hundreds, or thousands of motor revolutions per minute, depending upon the motor and gearing ratios utilized, to begin regenerative braking.

There is, therefore, a need in the art for a more efficient regenerative braking apparatus and method which addresses the shortcomings of the available art. However, the applicant knows of no prior art which satisfies all of the aforementioned problems. More specifically, the following is the most relevant prior art known to the applicant.

U.S. Pat. No. 4,479,080 to Lambert is directed to an electrical braking control for DC series traction motors that initiates braking in a plug mode, transitions to regeneration mode, and returns to plug mode when regeneration braking is no longer efficient, with all switching carried out smoothly and efficiently without unduly wasting regenerative power. A series wound traction motor includes an armature winding, a field winding, a mechanical arrangement, and a battery source. A power regulating circuit is used and the field winding is arranged to be connected in either a forward or reverse direction by means of a plurality of contacts. A current shunt is connected in series with the motor and power source to supply a signal to the motor controller. Included in the circuit is a plugging diode, a free-wheeling diode, and a regenerative braking diode. Upon initiation of braking by the operator, the direction and brake logic circuit will switch from propulsion to plug braking mode. Signals from the shunt and the percent on-time controller are monitored by the regeneration control circuit and, if efficient, will switch into regenerative braking mode. When the motor speed decreases to the point that the regulator is operating at 100% duty cycle and the desired motor torque cannot be maintained, the braking operation will switch back to plug mode. While the Lambert device is somewhat effective, it has several disadvantages. One primary disadvantage is that, in the Lambert device the contactor 22 is switched from a closed position to an open position to force the transition from plug mode to regenerative braking mode. Using the contactor 22 as a switch between these modes exposes the contactor 22 to a welding risk since the contactor 22 cannot instantaneously go from the closed position to opened position. Another disadvantage in the Lambert device is its transition from regenerative braking mode to plug mode when a required motor torque cannot be maintained due to low motor rotation speed. As can readily be appreciated, this transition drains of the charge the battery stored during regenerative breaking. A further disadvantage in the Lambert device is its inability to regulate regenerative braking at high speeds.

U.S. Pat. No. 5,332,954 to Lankin is directed to a solid state electronic control for DC traction motors having a series or separate field. The control provides for regenerative braking at low motor speeds. The optimum configuration of a DC motor controller includes a plurality of MOSFET devices to connect the series wound or separately excited traction motor to the power source for propulsion or braking. During vehicle operation, a control logic circuit continuously pulls a brake sensor to determine if conditions are suitable for regenerative braking. When selected, the field circuit with the bridge arrangement of MOSFET devices can provide strong regenerative braking by supplying full field as required.

U.S. Pat. No. 4,730,151 to Florey, et al., is directed to a continuous field control of series wound motors, particularly for use in regulating electrical braking current in a direct current electric traction motor. A DC series motor with an armature and field winding is supplied power either in series or in parallel for operation in the running or braking mode. In normal, forward or reverse operation, the motor is connected in series mode with the battery supplying power to the armature connected in series with the field. Control is provided by a microprocessor controlling a chopper control in series with the motor. Field control mode, with the armature across the battery and the field in series with the chopper control, is used for maximum power in the running mode or for full control in regenerative braking mode.

U.S. Pat. No. 4,422,021 to Schwarz is directed to highly efficient recuperation of energy stored in a dynamo electric machine system using a control system that includes a controlled switch to initiate field current to start generation. The motor is controlled by a circuit including field reversing switches and a control switch. Upon braking, the field is reversed using the field switches and the controlled switch. A thyristor or transistor, is turned on, along with turn-off thyristor, to supply energy stored in capacitor to cause a field current in a winding. After the release of an impulse from the capacitor, the field current is maintained by a field diode until the generator action of the dynamo starts. A control unit will control the duty cycle of the cycling period, maintaining the current flow through the armature at an appropriate value.

Finally, U.S. Pat. No. 4,124,812 to Naito, et al., is directed to a braking control for a battery operated forklift that executes a regeneration mode, then plugging. Voltage from a battery is controlled by a chopping circuit and applied to the series circuit comprised of a motor field coil and motor armature. For braking, a regeneration contractor is switched and the armature and field are connected in parallel with one another, and in series with the chopping control across the battery for regenerative braking. After the velocity detector determines that the speed is down to a predetermined value, the braking is changed over to plugging.

SUMMARY OF THE INVENTION

Presently, electric vehicles driven by direct current motors use regenerative braking systems which require the motor to turn at a relatively high rate of speed prior to transition into a regenerative braking mode. The higher speed is necessary to excite the armature winding of the motor with the residual magnetism present in the motor housing. This speed requirement narrows the useful regenerative braking range of most D.C. motor speed controllers, thereby lowering the overall efficiency of the controllers and the range of vehicles to which the controllers can be attached.

To address the shortcomings of the prior art, the present invention provides an apparatus and method for regenerative braking in direct current motors. A preferred embodiment is designed for, but not limited to, application in electric vehicles. The inventive regenerative braking apparatus comprises a MOSFET transistor positioned to quickly alter the path of motor current in a regenerative braking circuit and means for utilizing a MOSFET transistor switch to initiate the regenerative braking sequence and maintain the dynamic braking torque of the motor by maintaining the desired field winding current.

The inventive method comprises first entering a transient mode from a drive mode. In the transient mode, the current driven by the DC battery flows through the field winding in a direction opposing the existing direction of motor rotation for a limited period of time. This current causes the armature to act as an electrical generator. The armature acts as an electrical generator due to the opposing flux in the armature and field windings. The generator action causes current to flow in a transient circuit which preferably includes a power diode normally reverse-biased across the armature of the motor and a MOSFET transistor in series with the power diode.

Two important benefits are realized by establishing the transient mode of operation prior to entering a regulated current regenerative braking mode. First, current flows from the battery through the field and armature windings of the motor in a direction which sufficiently excites the armature winding to generate a maintainable armature current. Second, a steady-state regulated current is established in the motor during the transient mode prior to entering the regulated current regenerative braking mode. In particular, a regulated current is present in the field and armature windings prior to the transition from the transient mode to the regulated current regenerative braking mode. After the regulated current reaches a predetermined magnitude, the controller turns off the drive signal to the Regen FET, thereby altering the path of the current in the motor circuit (i.e., the transition from transient mode to regulated current regenerative braking mode occurs). The current path is altered while the regulated current is flowing through the motor circuit. The abrupt change in the current path generates a regulated regenerative braking current.

Thus, a notable feature of the present invention is the substantially instantaneous transition, permitted by the incorporation of an FET switch, from the drive mode to the regulated current regenerative braking mode, without diminishment of the current through the motor windings or the degradation of the flux interaction between the motor windings.

Another notable feature of the present invention is the low speed implementation of regulated current regenerative braking. A key element of the low speed implementation of regulated current regenerative braking is the control circuit's anticipation of the difference between the power derived from the motor circuit in the transient mode and the power which would be extracted from the motor in the regulated current regenerative braking mode. In the transient mode, the power is the product of the established current and the voltage drops across the motor windings, conductors, and the reverse biased diode. The voltage may be from a few volts to tens of volts in typical electric vehicle applications.

However, in the regulated current regenerative braking mode, the voltage from the armature circuit must be greater than the sum of the battery voltage, the diode voltage drops, and the voltage drop across other conductors. Also, the voltage generated in the armature circuit must be substantially greater than the battery voltage to achieve battery currents in the tens, or hundreds of amps.

This implementation of regulated current regenerative braking anticipates the pulse width modulation (PWM) of the motor voltage which would be required to successfully transition from the transient mode to the regenerative braking mode and very rapidly establishes the necessary PWM in the motor circuit as the transition is made from the transient mode to regulated current regenerative braking mode.

Another notable feature of the present invention relates to the ability to continue extracting power from the motor system in a constant PWM regenerative braking mode, as the vehicle brakes to a stop. In a preferred embodiment, the controller would regulate the current in the motor system to sustain a braking torque, as requested by depression of the brake pedal, until the PWM approaches 100%. In the constant PWM regenerative braking mode, the controller would maintain the PWM at some high level less than 100%, such as 96%, while allowing the current present in the regenerative braking circuit to diminish as the vehicle slows to a stop. Although the current and braking torque would continue to diminish, energy would continue to be extracted from the motor system. In operation, the driver would experience a steady reduction of braking torque during the constant PWM regenerative braking mode. The driver would compensate for the perceived decrease in braking torque by increasing brake pedal pressure. The net effect of the decreasing braking torque due to regenerative braking and the driver's increase in brake pedal pressure is the seamless transition into hydraulic braking as the vehicle slows to a stop.

In contrast to the above feature of the present invention, the regenerative braking device disclosed in Lambert, U.S. Pat. No. 4,479,080, alternates between regenerative braking and plug braking. In Lambert, when the current generated in the armature circuit falls below the current necessary to achieve the braking torque requested by the driver, the controller switches the motor system to a plug mode of operation. The plug mode of operation has the undesirable characteristics of power consumption and heat dissipation. In particular, power from the battery is consumed to maintain the requested plug braking current and the kinetic energy of the vehicle is dissipated as waste heat.

A first advantage of the present invention is therefore the enablement of a transition to regenerative braking at a much lower motor speed than in the prior art.

Another advantage of the present invention is that as the vehicle slows and the energy available from the motor for regenerative braking diminishes to a point where the requested battery charging current can no longer be maintained, a smooth transition to a constant PWM regenerative braking mode occurs. During the constant PWM regenerative braking mode, energy continues to be extracted from the motor as the motor approaches very low motor speeds.

Briefly stated, a regenerative braking control apparatus is provided for use with a motor driven by a D.C. power source. In response to a series of operating parameters, the control apparatus causes the motor to transition between a drive mode, a transient mode, a regulated current regenerative braking mode, and a constant PWM regenerative braking mode. In particular, the motor enters the drive mode in response to a request for an increase in speed, the motor enters the transient mode in response to a request for a decrease in speed, the motor enters the regulated current regenerative braking mode in response to a lapse of a predetermined time delay or in response to a request for a reduction in the magnitude of the previously requested decrease in speed, and the motor enters the constant PWM regenerative braking mode in response to a request to continue braking when a requested braking torque cannot be maintained.

A feature of the invention includes a control apparatus for controlling the regenerative braking of a motor electrically connected to a D.C. power source, the control apparatus having control means for generating at least one of a drive mode signal, a transient mode signal, a first regenerative braking mode signal and a second regenerative braking mode signal in response to a plurality of operating parameter signals, drive mode means responsive to the drive mode signal for causing the motor to operate in a drive mode such that the motor is driven in a first direction of rotation by the D.C. power source, transient mode means responsive to the transient mode signal for causing the motor to transition from the drive mode to a transient mode such that a flux builds up in an armature winding and a field winding of the motor, the flux generating a current flow through a transient circuit path running through the motor, and first regenerative braking mode means responsive to the first regenerative braking mode signal for causing the motor to transition from the transient mode to a first regenerative braking mode such that the current flow switches from the transient circuit path to a charging circuit path interconnecting the motor and the D.C. power source, the flux charging said D.C. power source and generating a requested braking torque in the motor in a second direction of rotation opposing the first direction of rotation, the requested braking torque having a constant magnitude.

Another feature of the invention includes a control apparatus for controlling the regenerative braking of a motor electrically connected to a D.C. power source, the control apparatus including control means for generating at least one of a drive mode signal, a transient mode signal, a first regenerative braking mode signal and a second regenerative braking mode signal in response to a plurality of operating parameter signals, drive mode means responsive to the drive mode signal for causing the motor to operate in a drive mode such that the motor is driven in a first direction of rotation by the D.C. power source, transient mode means responsive to the transient mode signal for causing the motor to transition from the drive mode to a transient mode such that a flux builds up in an armature winding and a field winding of the motor, the flux generating a current flow through a transient circuit path running through the motor, first regenerative braking mode means responsive to the first regenerative braking mode signal for causing the motor to transition from the transient mode to a first regenerative braking mode such that the current flow switches from the transient circuit path to a charging circuit path interconnecting the motor and the D.C. power source, the flux charging the D.C. power source and generating a requested braking torque in the motor in a second direction of rotation opposing the first direction of rotation, the requested braking torque having a constant magnitude, and second regenerative braking mode means responsive to the second regenerative braking mode signal for causing the motor to transition from the first regenerative braking mode to a second regenerative braking mode such that the flux continues to charge the D.C. power source while generating a diminishing braking torque, the diminishing braking torque having a maximum magnitude that is less than the constant magnitude of the requested braking torque.

Yet another feature of the invention includes a control apparatus for controlling the regenerative braking of a motor electrically connected to a D.C. power source, the control apparatus including control means for generating a drive mode signal in response to a request for an increase in motor speed, a transient mode signal in response to a request for a decrease in motor speed, a first regenerative braking mode signal in response to one of a lapse of predetermined time delay or a request for a reduction in the decrease in motor speed, and a second regenerative braking mode signal in response to an inability to maintain the requested decrease in motor speed, drive mode means responsive to the drive mode signal for causing the motor to operate in a drive mode such that the motor is driven in a first direction of rotation by the D.C. power source, transient mode means responsive to the transient mode signal for causing the motor to transition from the drive mode to a transient mode such that a flux builds up in an armature winding and a field winding of the motor, the flux generating a current flow through a transient circuit path running through the motor, first regenerative braking mode means responsive to the first regenerative braking mode signal for causing the motor to transition from the transient mode to a first regenerative braking mode such that the current flow switches from the transient circuit path to a charging circuit path interconnecting the motor and the D.C. power source, the flux charging the D.C. power source and generating a requested braking torque in the motor in a second direction of rotation opposing the first direction of rotation, the braking torque having a constant magnitude, and second regenerative braking mode means responsive to the second regenerative braking mode signal for causing the motor to transition from the first regenerative braking mode to a second regenerative braking mode such that the flux continues to charge the D.C. power source while generating a diminishing braking torque, the diminishing braking torque having a maximum magnitude that is less than the constant magnitude of the requested braking torque.

A further feature of the invention includes a method of regenerative braking a motor electrically connected to a D.C. power source including the steps of generating at least one of a drive mode signal, a transient mode signal, a first regenerative braking mode signal, and a second regenerative braking mode signal in response to reception of a plurality of operating parameter signals, operating the motor in a drive mode in response to reception of the drive mode signal such that the motor is driven in a first direction of rotation by the D.C. power source, causing the motor to transition from the drive mode to a transient mode in response to reception of the transient mode signal such that a flux builds up in an armature winding and a field winding of the motor, the flux generating a current flow through a transient circuit path running through the motor, causing the motor to transition from the transient mode to a first regenerative braking mode in response to reception of the first regenerative braking mode signal such that the current switches from the transient circuit path to a charging circuit path interconnecting the motor and the D.C. power source, the charging circuit path permitting the flux in the motor to charge the D.C. power source and to generate a requested braking torque in the motor in a second direction of rotation opposing the first direction of rotation, the requested braking torque having a constant magnitude, and causing the motor to transition from the first regenerative braking mode to the second regenerative braking mode in response to reception of the second regenerative braking mode such that the flux continues to charge the D.C. power source while generating a diminishing braking torque, the diminishing braking torque having a maximum magnitude that is less than the constant magnitude of the requested braking torque.

A still further feature of the invention includes a control apparatus for controlling the regenerative braking of a motor electrically connected to a D.C. power source, the control apparatus including a controller that generates at least one of a drive mode signal, a transient mode signal, and a first regenerative braking mode signal in response to reception of a plurality of operating parameter signals, drive mode circuitry responsive to the drive mode signal to cause the motor to operate in a drive mode such that the motor is driven in a first direction of rotation by the D.C. power source, transient mode circuitry responsive to the transient mode signal to cause the motor to transition from the drive mode to a transient mode such that a flux builds up in an armature winding and a field winding of the motor, the flux generating a current flow through a transient circuit path running through the motor, and first regenerative braking mode circuitry responsive to the first regenerative braking mode signal to cause the motor to transition from the transient mode to a first regenerative braking mode such that the current flow switches from the transient circuit path to a charging circuit path interconnecting the motor and said D.C. power source, the flux charging the D.C. power source and generating a requested braking torque in the motor in a second direction of rotation opposing the first direction of rotation, the braking torque having a constant magnitude.

An additional feature of the invention includes a control apparatus for controlling the regenerative braking of a motor electrically connected to a D.C. power source, the control apparatus including a controller that generates at least one of a drive mode signal, a transient mode signal, a first regenerative braking mode signal, and a second regenerative braking mode signal in response to reception of a plurality of operating parameter signals, drive mode circuitry responsive to the drive mode signal to cause the motor to operate in a drive mode such that the motor is driven in a first direction of rotation by the D.C. power source, transient mode circuitry responsive to the transient mode signal to cause the motor to transition from the drive mode to a transient mode such that a flux builds up in an armature winding and a field winding of the motor, the flux generating a current flow through a transient circuit path running through the motor, first regenerative braking mode circuitry responsive to the first regenerative braking mode signal to cause the motor to transition from the transient mode to a first regenerative braking mode such that the current flow switches from the transient circuit path to a charging circuit path interconnecting the motor and the D.C. power source, the flux charging the D.C. power source and generating a requested braking torque in the motor in a second direction of rotation opposing the first direction of rotation, the braking torque having a constant magnitude, and second regenerative braking mode circuitry responsive to the second regenerative braking mode signal to cause the motor to transition from the first regenerative braking mode to a second regenerative braking mode such that the flux continues to charge the D.C. power source while generating a diminishing braking torque, the diminishing braking torque having a maximum magnitude that is less than the constant magnitude of the requested braking torque.

BRIEF DESCRIPTION OF THE DRAWINGS

The aforementioned advantages of the present invention, as well as additional advantages thereof, will be more clearly understood hereinafter as a result of a detailed description of a preferred embodiment of the invention when taken in conjunction with the following drawings, in which.

DETAILED DESCRIPTION OF A PREFERRED EMBODIMENT

Drive Mode

Figure 1:
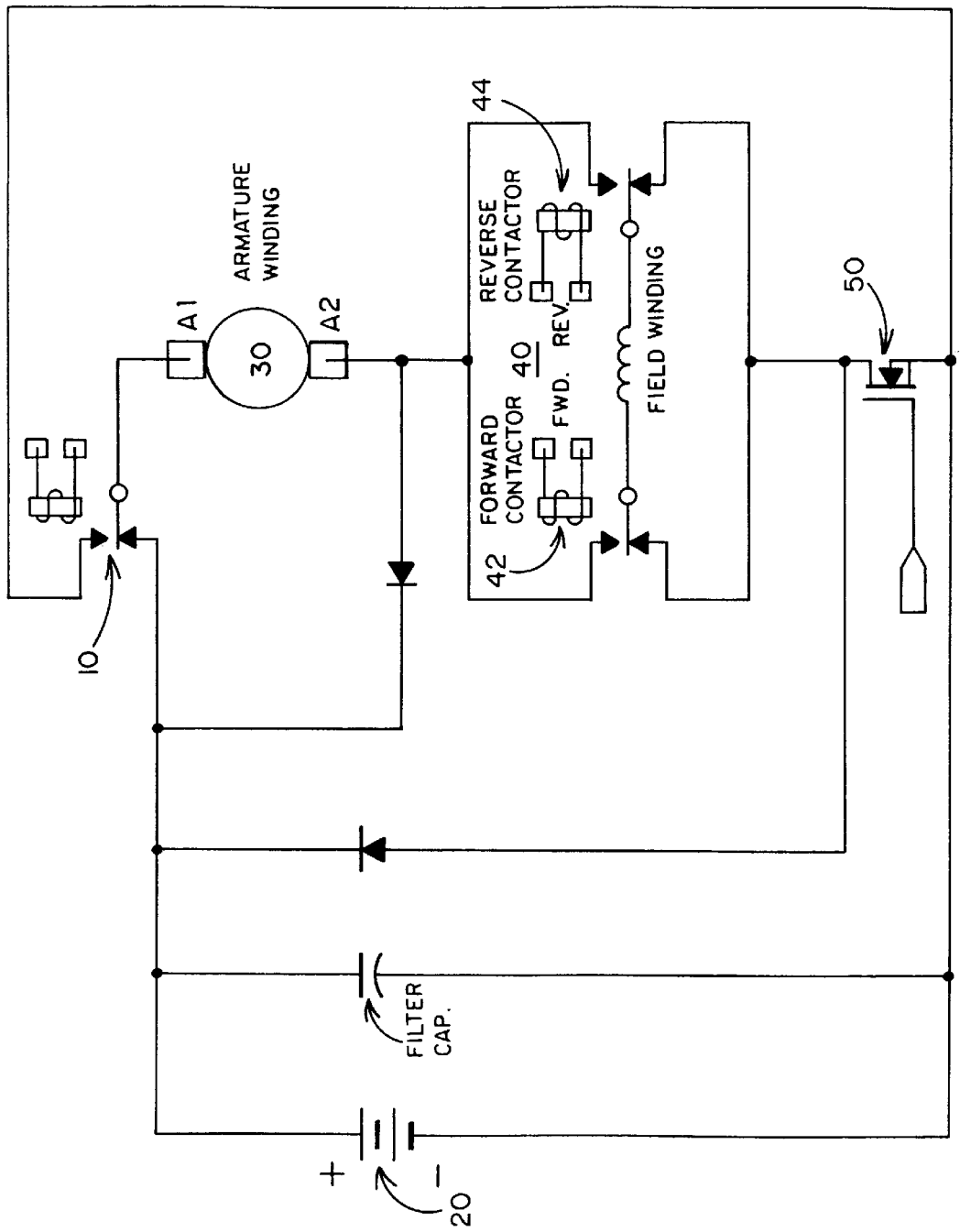
FIG. 1 is a circuit schematic illustrating a Zapi regenerative braking apparatus.
Figure 2:
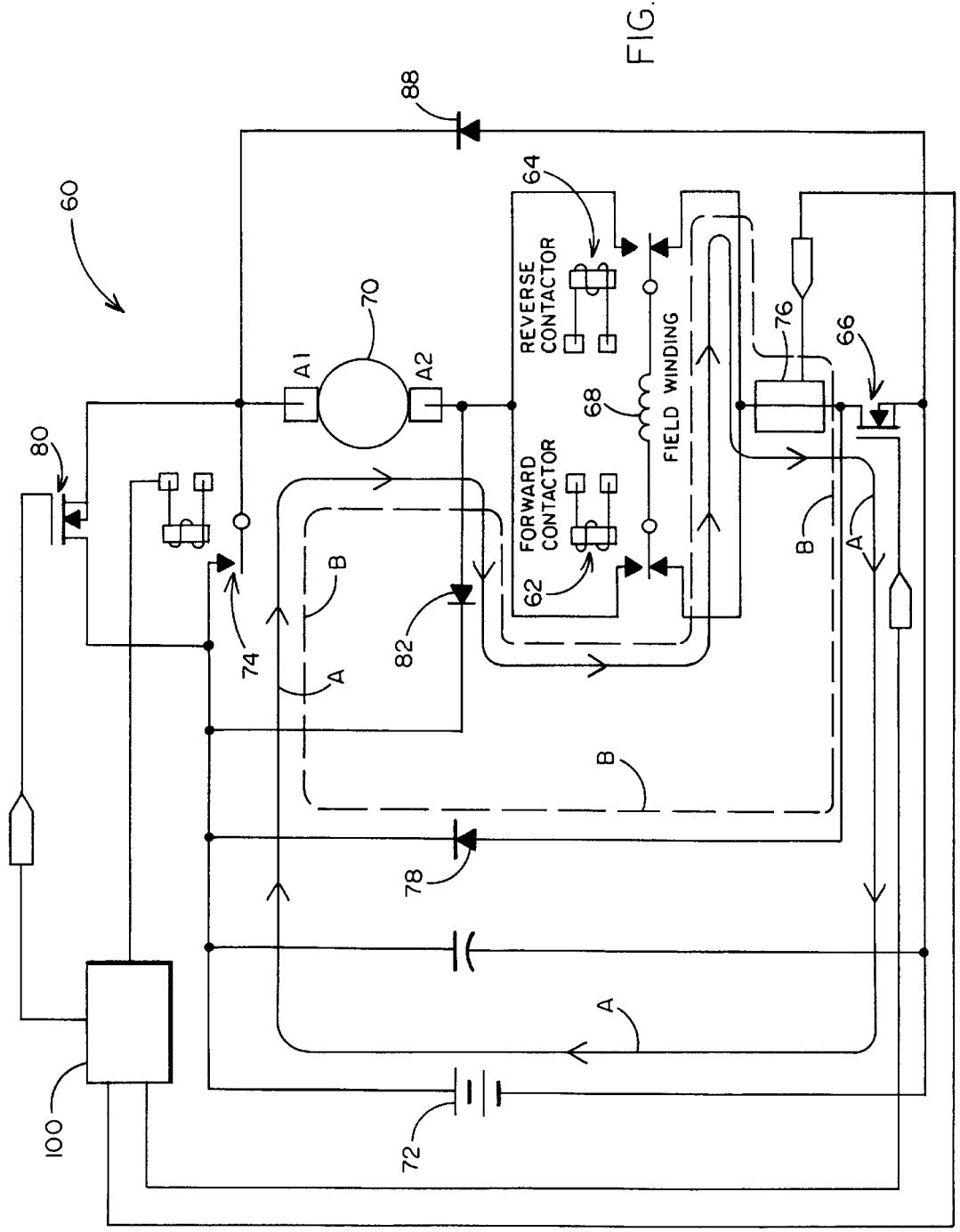
FIG. 2 is a circuit schematic of the present invention illustrating the flow of current through the circuit while the circuit is in the drive mode.

Referring now to FIG. 2, a control circuit 60 for regenerative braking is shown in the drive mode. The drive mode exists when the motor is being operated to propel a vehicle forward or backward. We will assume a forward contactor coil 62 is energized and a reverse contactor coil 64 is not energized. Motor Drive FETs 66 have a controlled pulse width modulation (PWM) duty cycle in which the Motor Drive FETs 66 alternate between being on and being off. A controller 100, such as a 32 bit microprocessor, controls the PWM duty cycle in response to a detected depression on the accelerator pedal (not shown). The current path through a field winding 68 when the Motor Drive FETs 66 are turned on is marked as path "A" (solid line). The current path through the field winding 68 when the Motor Drive FETs 66 are turned off is marked as path "B" (dashed line). Current path "A" extends from the battery 72 through the regenerative braking contactor 74, the armature 70, the field winding 68, the current sensor 76 and the motor drive FET 66, and back to the battery 72. Current path "B" extends from the armature 70 through the field winding 68, the current sensor 76, the free wheel diode 78 and the regenerative braking contactor 74, and back to the armature 70.

Transient Mode

Figure 3:
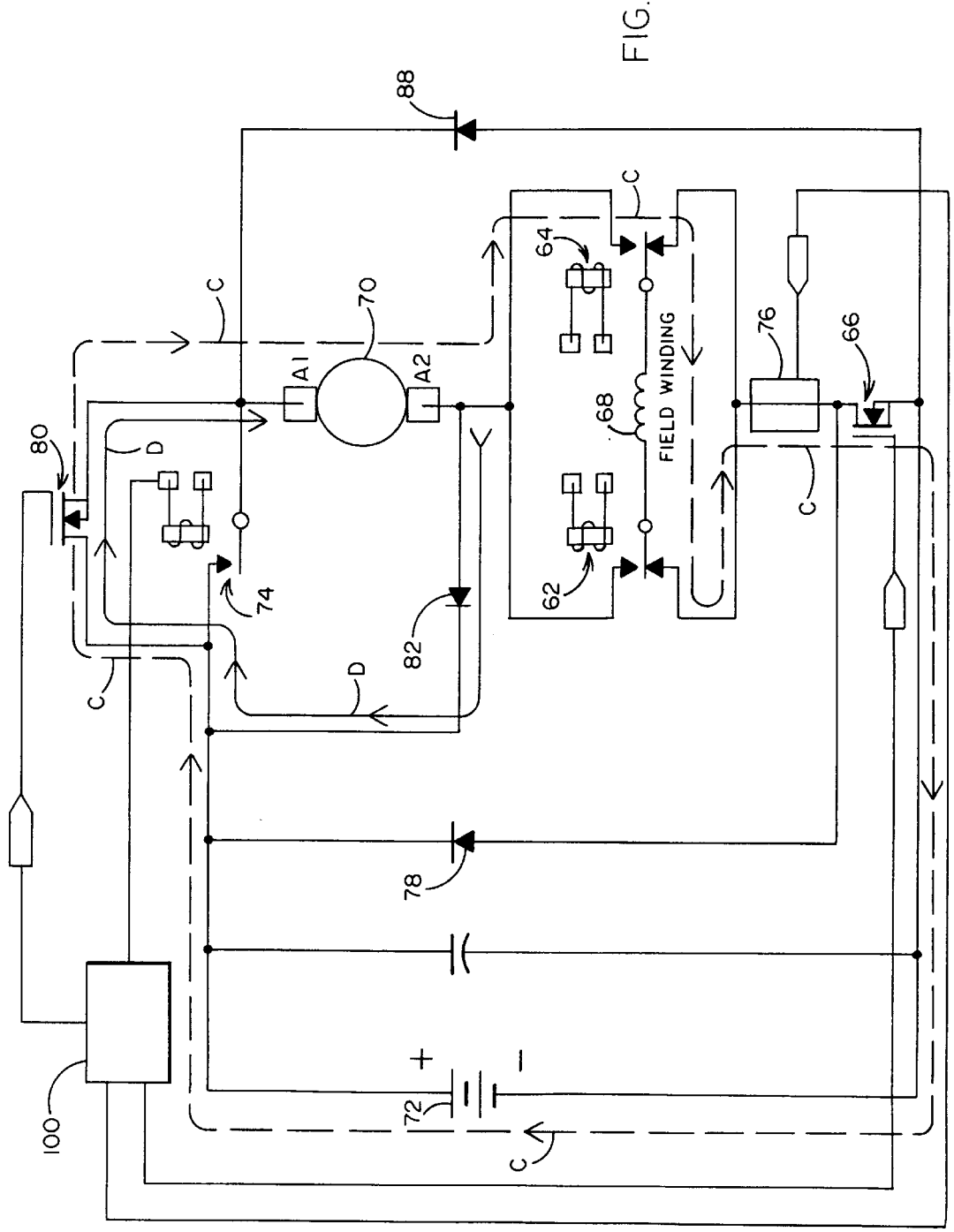
FIG. 3 is a circuit schematic of the present invention illustrating the flow of current through the circuit while the circuit is in the transient mode.

Referring now to FIG. 3, when the controller 100 detects a depression of a brake pedal (not shown) by the operator of the electric vehicle, the controller 100 initiates a transient mode as shown. The controller 100 terminates a signal to the Motor Drive FET 66 thereby turning off the Motor Drive FET 66 and interrupting the motor current "A" (shown in FIG. 2). The controller 100 then reverses the direction of the contactors 62 and 64 by energizing the reverse contactor 64 and de-energizing the forward contactor 62. This sets up the polarity of current through the field winding 68 and the armature 70 that is needed to generate a braking torque in the motor and to develop the counter electro-magnetic force (EMF) in the armature necessary for regenerative braking.

The controller 100 then de-energizes the regenerative braking contactor 74 and turns on the Regen FET 80 by an enabling signal to its gate drive input pin. At the time the Regen FET 80 is turned on, there is no current flowing through the transient circuit. When the contactors 62, 64, and 74 are determined to be stabilized in their new conducting states by either the lapse of a predetermined delay or by a closure sense circuit, the controller 100 initiates current in the transient circuit by applying a PWM signal to the motor drive FETs 66. For example, after a delay, preferably on the order of 50 milliseconds, to allow the contactors 62, 64, and 74 to reach their new states, the controller 100 reactivates the Motor FET Drive 66. This permits current to flow through the armature 70 and field winding 68 along a current path "C". As current begins developing along the current path "C", the interaction of the flux in the field winding 68 and the armature winding 70 increases. The voltage generated in the armature 70, due to the flux interaction, causes an armature current to flow along a transient current path "D" which extends through the now forward-biased diode 82. As discussed in further detail below, a lower armature voltage can cause current to flow along transient current path "D" than can cause current to flow along the regenerative braking path, shown in FIG. 4, since the voltage generated by the armature 70 only needs to forward-bias the diode 82 to start current flow through current path "D". Preferably, an armature voltage of about 1 to 1.5 volts is enough to forward-bias diode 50. Current path "D" also extends through Regen FET 80 which is connected in parallel with regenerative braking contactor 74. Since Regen FET 80 only carries the transient current flowing through path "D" for a relatively short time period, preferably on the order of 100 milliseconds, Regen FET 80 can preferably be a large inexpensive MOSFET. However, the MOSFET used must be able to carry a current of 50 to 75 amps without malfunctioning for the short time period the transient mode exists.

Regulated Current Regenerative Braking Mode

Figure 4:
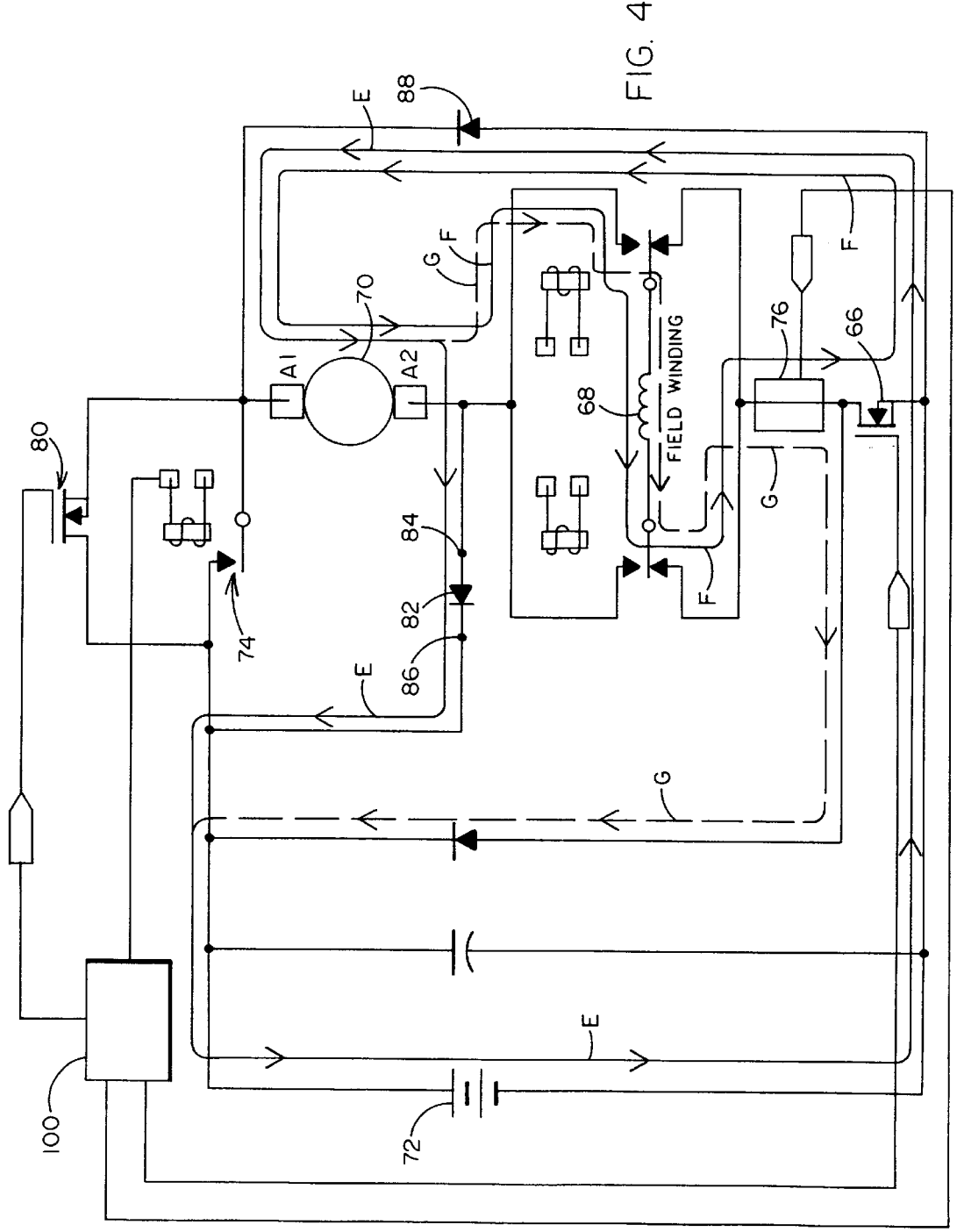
FIG. 4 is a circuit schematic of the present invention illustrating the flow of current through the circuit while the circuit is in the regulated current regenerative braking mode and the constant PWM regenerative braking mode.

Referring now to FIG. 4, once the current in path "D" is established, the Regen FET 80 is abruptly turned off. Since the regenerative braking contactor 74 is off (in the open position), the only remaining path for current flow from the armature 70 is current path "E". Current path "E" extends through the battery 72 in the direction from the positive terminal to the negative terminal. With an initial current flowing along path "D", the transition to the regulated current regenerative braking mode from the transient mode is achieved under substantially optimal conditions, i.e., flux present in the field winding 68, an existing current flow along path "D", and a current path "E" through the battery 72 from the armature 70. As a result, the controller 100 can anticipate the optimal PWM of the motor drive FETs 66 necessary to charge the battery 72 and generate the requested braking torque prior to causing the motor to transition into the regulated current regenerative braking mode.

The following is an example of how the controller anticipates the optimal PWM of the motor drive FETs 66 necessary to charge the battery 72 and generate the requested braking torque prior to causing the motor to transition into the regulated current regenerative braking mode. As explained above, a transient current begins to flow along current path "C" after the controller 100 applies a PWM signal to the motor drive FETs 66. The transient current increase at a rate dependent on the time constant of the motor windings and the rate of change (between "on" and "off") of the PWM drive signal to the motor drive FETs 66. The controller 100 monitors the transient current flow via the current sensor 76. After the transient current has reached a minimum current level necessary for transition to the regulated current regenerative braking mode, the controller 100 can shut off Regen FET 80. To optimize this transition, the controller calculates the PWM signal to the motor drive FETs 66 necessary to establish the battery charging current (which flows along current paths "E" and "G") prior to initiating the transition. It should be noted that the PWM drive signal to the motor drive FETs 66 during the transient mode is different than the PWM drive signal to the motor drive FETs 66 during the regulated current regenerative braking mode. This difference is due to a couple of reasons. In the transient mode of operation, the voltage output of the armature is determined by the voltage drops of the motor windings, the conductors, and the diode drops in circuit path "D". As a result, it may take a few volts to tens of volts to generate the transient current in circuit path "D". However, in the regulated current regenerative braking mode, the voltage output of the armature must be greater than the battery voltage to forward-bias the diodes 82 and 88 in circuit path "E". Therefore, during regenerative braking, the armature provides a much larger voltage than previously provided during the existence of the transient circuit. For example, in a 144 volt system, the ratio of the regenerative braking mode PWM signal to the motor drive FETs 66, to the transient mode PWM signal, to the motor drive FETs 66 is on the order of 10–20 to 1. Therefore, when the transition to regenerative braking occurs, the PWM signal may have to change from 4% PWM to 80% PWM to sustain a current through current path "E". In the prior art, it would take more than 100 milliseconds for the prior art controllers to gradually increase the PWM signal from 4% PWM to 80% PWM. However, a delay of this magnitude would cause the current initially generated along transient path "D" to decay long before it could flow along current path "E". Therefore, in the present invention, the controller 100 calculates the required PWM necessary to cause current to flow along current path "E" prior to causing the control system 60 to transition from the transient mode to the regulated current regenerative braking mode. Accordingly, when the transition takes place, the controller instantly applies the calculated or anticipated PWM signal to the motor drive FETs 66.

Although the only remaining current path is current path "E" through battery 72, the diode 82 can no longer be forward biased with just 1 to 1.5 volts of potential at anode 84 with respect to armature terminal A2, since the cathode 86 of diode 82 is at the same potential as the positive battery terminal. As a result, the output of the armature will increase to at least 1 volt above the battery voltage to forward bias the plug diode. Furthermore, the armature voltage will increase to a voltage which permits the armature current to charge the battery 72.

The current through field winding 68 is preferably regulated to maintain the desired braking torque. The current sensor 76 monitors the magnitude of the field winding current and provides current magnitude data to the controller 100 which, in turn, modulates the PWM signal to motor drive FETs 66 to maintain the desired field winding current. In particular, the controller 100 pulse width modulates the current going through the motor drive FETs 66 by altering the PWM duty cycle of the motor drive FETs 66. When the motor drive FETs 66 are turned "on" by the controller 100 the current flows along current path "F", building the field winding flux to the level required to generate the field current necessary to maintain the requested braking torque. When the motor drive FETs are turned "off" by the controller 100, the current flows along current paths "E" and "G", charging the battery 72. As the battery 72 is charged the maximum flux level possible in the field winding 68 is reduced. Over time, the motor drive FETs must be turned "on" for longer periods of time to build the field winding flux to the level required for generating the field winding current necessary to maintain the requested braking torque. If permitted, the motor drive FETs would eventually remain in the "on" state so 100% of the current would travel along current path "F", thereby maintaining the flux in the field winding at the level necessary to generate the requested field winding current. However, even with the motor drive FETs in a continuous "on" state (i.e., 100% duty cycle), the field winding flux would eventually drop below the level necessary to generate the requested torque and field winding current. It is at this point in the prior art when the battery 72 would be used in a plug braking mode to build the field winding flux.

Constant PWM Regenerative Braking Mode

In the preferred embodiment of the present invention, when the vehicle slows to the point where the output of the armature can no longer supply sufficient current to generate the requested braking torque, controller 100 will run the motor drive FETs at a 96% duty cycle. This means that the motor drive FETs 66 will be "on" 96% of the time and "off" 4% of the time. Afterwards, the controller 100 will monitor the field winding current via the current sensor 76 to determine if the current has increased to a level where the motor could deliver the requested current at 96% PWM. For example, as the vehicle slows to a speed where 98% PWM is required for the motor to provide a current which generates the requested braking torque, the controller 100 will regulate the current at some value less than the requested current such that the PWM of 96% is not exceeded. If the motor speed increases, as would happen if the vehicle starts to accelerate down a slope, the available current which could be generated by the motor at 96% PWM would increase. If the vehicle continued to increase its speed on the downward slope, the motor current would rise to the point where the motor could deliver the requested current at 96% PWM. Any further increase in motor speed would cause a transition back to regulated current regenerative braking mode, which would hold the current at the requested level by varying the PWM. However, if vehicle continued to slow to a speed where even a PWM of 100% would not provide the requested current, the controller would continue to hold the PWM constant at 96% while allowing the current traveling along paths "E", "F", and "G" to diminish as the vehicle slows to a stop. Although the braking torque and the current traveling along paths "E", "F", and "G" would continue to diminish, energy would still be extracted from the motor system. In operation, the driver will experience a steady reduction of braking torque during the constant PWM regenerative braking mode. The driver will compensate for the perceived decrease in braking torque by increasing brake pedal pressure. The net effect of the decreasing braking torque due to regenerative braking and the driver's increase in brake pedal pressure is the seamless transition into hydraulic braking as the vehicle slows to a stop. This not only provides a smooth torque to nearly zero RPM, but, more importantly, there is preferably no skipping into and out of regenerative braking at low speeds as experienced by most prior art controllers.

A significant benefit of maintaining the constant PWM regenerative braking mode after the regulated current regenerative braking mode has terminated is the ability to re-establish the regulated current regenerative braking mode at a lower level of current without having to transition to normal drive mode first. For example, if the regulated current regenerative braking mode is initially established with 100 amps of field current while the vehicle is moving at 30 miles per hour and the vehicle slows to 5 miles per hour, the regulated current regenerative braking mode may terminate, since the requested braking torque requiring 100 amps of field current cannot be maintained by a motor speed which is propelling the vehicle at 5 miles per hour when a large portion of the energy in the motor windings is being used to charge the battery 72. However, in the constant PWM regenerative braking mode the current primarily flows along current path "F" to generate the requested braking torque. If the driver then decreases the brake pedal pressure to a position which requires only 50 amps of field current, the regulated current regenerative braking mode will then be re-established automatically, since the field winding can maintain a current that induces the necessary braking torque with the armature winding, and the flux present in the motor windings can provide the necessary current to charge the battery 72. The apparatus of the present invention thereby allows for a very smooth transition between the constant PWM regenerative braking mode and the regulated current regenerative braking mode without abrupt changes in the vehicle's braking torque, while allowing maximum extraction of battery charging energy from the vehicle's motion at low speeds. It should be noted that although all of the energy in the motor windings can be used to generate a braking torque in the constant PWM regenerative braking mode, a small amount of energy from the motor windings is preferably used to charge the battery. In other words, the Motor drive FETs 66 are preferably run at a 96% duty cycle such that some regenerative braking occurs.

The preferred method of the present invention for regenerative braking may therefore be summarized as follows:
1. In response to depression of the vehicle's brake pedal, controller 100 shuts off the motor drive.
2. Contactors 62 and 64 are reversed, allowing the motor to be driven in a direction opposing the vehicle's motion.
3. Regenerative braking contactor 74 is de-energized, breaking the path of current from battery 72 to the armature winding 70 and the field winding 68.
4. Regen FET 80 is turned on to provide a path for battery current to the motor.
5. As motor drive FETs 66 are energized, current begins to flow in a direction which tends to drive the motor against its previous direction of rotation.
6. The motor acts as a generator due to the opposing flux in the armature windings 70 and field windings 68.
7. The motor/generator induces current flow from armature connection A2 through plug diode(s) 82 and back to the armature connection A1.
8. While field winding current is flowing and the armature current is flowing, the Regen FET 80 is abruptly turned off.
9. The instantaneous change in the current path from the battery 72 to the motor causes motor current to flow through battery 72 as charging current, thus inducing regenerative braking.
10. The charging current level is maintained by pulse width modulating (PWM) at motor drive FETs 66. During the "on" time of the PWM cycle the field winding current builds to the desired level, and during the "off" time of the PWM cycle regenerative braking current flows through the battery 72 and Regen diode 88.
11. Flux in field winding 68 is maintained by the current from the armature 70 while motor drive FETs 66 are turned on during the "on" time of the PWM cycle.

A general description of the apparatus and method of the present invention, as well as a preferred embodiment of both, has been set forth above. One skilled in the art will recognize and be able to practice many changes in many aspects of the apparatus and method described above, including variations which fall within the teachings of this invention. The spirit and scope of the invention should be limited only as set forth in the claims which follow.

What is claimed is:

1. A control apparatus for controlling the regenerative braking of a motor electrically connected to a D.C. power source comprising:

control means for generating at least one of a drive mode signal, a transient mode signal, a first regenerative braking mode signal and a second regenerative braking mode signal in response to a plurality of operating parameter signals;

drive mode means responsive to said drive mode signal for causing said motor to operate in a drive mode such that said motor is driven in a first direction of rotation by said D.C. power source;

transient mode means responsive to said transient mode signal for causing said motor to transition from said drive mode to a transient mode such that a flux builds up in an armature winding and a field winding of said motor, said flux generating a current flow through a transient circuit path running through said motor; and first regenerative braking mode means responsive to said first regenerative braking mode signal for causing said motor to transition from said transient mode to a first regenerative braking mode such that said current flow switches from said transient circuit path to a charging circuit path interconnecting said motor and said D.C. power source, said flux charging said D.C. power source and generating a requested braking torque in said motor in a second direction of rotation opposing said first direction of rotation, said requested braking torque having a constant magnitude.

2. The control apparatus of claim 1, further comprising:

a second regenerative braking mode signal generated by said control means in response to said plurality of operating parameter signals; and second regenerative braking mode means responsive to said second regenerative braking mode signal for causing said motor to transition from said first regenerative braking mode to a second regenerative braking mode such that said flux continues to charge said D.C. power source while generating a diminishing braking torque, said diminishing braking torque having a maximum magnitude that is less than said constant magnitude of said requested braking torque.

3. The control apparatus of claim 2 wherein said plurality of operating parameter signals include at least one of a decrease motor speed signal, an increase motor speed signal, and a lapse of predetermined time delay signal;

said control means generating said drive mode signal in response to said increase motor speed signal;

said control means generating said transient mode signal in response to said decrease motor speed signal;

said control means generating said first regenerative braking signal in response to one of said lapse of predetermined time delay signal or a reduction in a magnitude of said decrease motor speed signal; and said control means generating said second regenerative braking signal in response to said flux in said armature and said field windings being unable to generate said requested braking torque.

4. The control apparatus of claim 2 wherein said transition from said transient mode to said first regenerative braking mode is substantially instantaneous such that said current flow substantially instantaneously switches from said transient circuit path to said charging circuit path.

5. The control apparatus of claim 1 wherein said transition from said transient mode to said first regenerative braking mode is substantially instantaneous such that said current flow substantially instantaneously switches from said transient circuit path to said charging circuit path.

6. A control apparatus for controlling the regenerative braking of a motor electrically connected to a D.C. power source comprising:

control means for generating at least one of a drive mode signal, a transient mode signal, a first regenerative braking mode signal and a second regenerative braking mode signal in response to a plurality of operating parameter signals;

drive mode means responsive to said drive mode signal for causing said motor to operate in a drive mode such that said motor is driven in a first direction of rotation by said D.C. power source;

transient mode means responsive to said transient mode signal for causing said motor to transition from said drive mode to a transient mode such that a flux builds up in an armature winding and a field winding of said motor, said flux generating a current flow through a transient circuit path running through said motor;

first regenerative braking mode means responsive to said first regenerative braking mode signal for causing said motor to transition from said transient mode to a first regenerative braking mode such that said current flow switches from said transient circuit path to a charging circuit path interconnecting said motor and said D.C. power source, said flux charging said D.C. power source and generating a requested braking torque in said motor in a second direction of rotation opposing said first direction of rotation, said requested braking torque having a constant magnitude; and second regenerative braking mode means responsive to said second regenerative braking mode signal for causing said motor to transition from said first regenerative braking mode to a second regenerative braking mode such that said flux continues to charge said D.C. power source while generating a diminishing braking torque, said diminishing braking torque having a maximum magnitude that is less than said constant magnitude of said requested braking torque.

7. The control apparatus of claim 6 wherein said plurality of operating parameter signals include at least one of a decrease motor speed signal, an increase motor speed signal, and a lapse of predetermined time delay signal;

said control means generating said drive mode signal in response to said increase motor speed signal;

said control means generating said transient mode signal in response to said decrease motor speed signal;

said control means generating said first regenerative braking signal in response to one of said lapse of predetermined time delay signal or a reduction in a magnitude of said decrease motor speed signal; and said control means generating said second regenerative braking signal in response to said flux in said armature and said field windings being unable to generate said requested braking torque.

8. The control apparatus of claim 7 wherein said transition from said transient mode to said first regenerative braking mode is substantially instantaneous such that said current flow substantially instantaneously switches from said transient circuit path to said charging circuit path.

9. The control apparatus of claim 6 wherein said transition from said transient mode to said first regenerative braking mode is substantially instantaneous such that said current flow substantially instantaneously switches from said transient circuit path to said charging circuit path.

10. A control apparatus for controlling the regenerative braking of a motor electrically connected to a D.C. power source comprising:

control means for generating a drive mode signal in response to a request for an increase in motor speed, a transient mode signal in response to a request for a decrease in motor speed, a first regenerative braking mode signal in response to one of a lapse of predetermined time delay or a request for a reduction in said decrease in motor speed, and a second regenerative braking mode signal in response to an inability to maintain said requested decrease in motor speed;

drive mode means responsive to said drive mode signal for causing said motor to operate in a drive mode such that said motor is driven in a first direction of rotation by said D.C. power source;

transient mode means responsive to said transient mode signal for causing said motor to transition from said drive mode to a transient mode such that a flux builds up in an armature winding and a field winding of said motor, said flux generating a current flow through a transient circuit path running through said motor;

first regenerative braking mode means responsive to said first regenerative braking mode signal for causing said motor to transition from said transient mode to a first regenerative braking mode such that said current flow switches from said transient circuit path to a charging circuit path interconnecting said motor and said D.C. power source, said flux charging said D.C. power source and generating a requested braking torque in said motor in a second direction of rotation opposing said first direction of rotation, said braking torque having a constant magnitude; and second regenerative braking mode means responsive to said second regenerative braking mode signal for causing said motor to transition from said first regenerative braking mode to a second regenerative braking mode such that said flux continues to charge said D.C. power source while generating a diminishing braking torque, said diminishing braking torque having a maximum magnitude that is less than said constant magnitude of said requested braking torque.

11. The control apparatus of claim 10 wherein said transition from said transient mode to said first regenerative braking mode is substantially instantaneous such that said current flow substantially instantaneously switches from said transient circuit path to said charging circuit path.

12. A method of regenerative braking a motor electrically connected to a D.C. power source comprising the steps of:

generating at least one of a drive mode signal, a transient mode signal, a first regenerative braking mode signal, and a second regenerative braking mode signal in response to reception of a plurality of operating parameter signals;

operating said motor in a drive mode in response to reception of said drive mode signal such that said motor is driven in a first direction of rotation by said D.C. power source;

causing said motor to transition from said drive mode to a transient mode in response to reception of said transient mode signal such that a flux builds up in an armature winding and a field winding of said motor, said flux generating a current flow through a transient circuit path running through said motor;

causing said motor to transition from said transient mode to a first regenerative braking mode in response to reception of said first regenerative braking mode signal such that said current switches from said transient circuit path to a charging circuit path interconnecting said motor and said D.C. power source, said charging circuit path permitting said flux in said motor to charge said D.C. power source and to generate a requested braking torque in said motor in a second direction of rotation opposing said first direction of rotation, said requested braking torque having a constant magnitude; and causing said motor to transition from said first regenerative braking mode to said second regenerative braking mode in response to reception of said second regenerative braking mode such that said flux continues to charge said D.C. power source while generating a diminishing braking torque, said diminishing braking torque having a maximum magnitude that is less than said constant magnitude of said requested braking torque.

13. The method of claim 12, further comprising the steps of:

generating said drive mode signal in response to a request for an increase in motor speed;

generating said transient mode signal in response to a request for a decrease in motor speed;

generating said first regenerative braking signal in response to one of a lapse of a predetermined time delay signal or a reduction in a magnitude of said requested decrease in motor speed; and generating said second regenerative braking signal in response to said flux in said armature and said field windings being unable to maintain said requested braking torque.

14. The method of claim 12 wherein said transition from said transient mode to said first regenerative braking mode is substantially instantaneous such that said current flow substantially instantaneously switches from said transient circuit path to said charging circuit path.

15. A control apparatus for controlling the regenerative braking of a motor electrically connected to a D.C. power source comprising:

a controller that generates at least one of a drive mode signal, a transient mode signal, and a first regenerative braking mode signal in response to reception of a plurality of operating parameter signals;

drive mode circuitry responsive to said drive mode signal to cause said motor to operate in a drive mode such that said motor is driven in a first direction of rotation by said D.C. power source;

transient mode circuitry responsive to said transient mode signal to cause said motor to transition from said drive mode to a transient mode such that a flux builds up in an armature winding and a field winding of said motor, said flux generating a current flow through a transient circuit path running through said motor; and first regenerative braking mode circuitry responsive to said first regenerative braking mode signal to cause said motor to transition from said transient mode to a first regenerative braking mode such that said current flow switches from said transient circuit path to a charging circuit path interconnecting said motor and said D.C. power source, said flux charging said D.C. power source and generating a requested braking torque in said motor in a second direction of rotation opposing said first direction of rotation, said braking torque having a constant magnitude.

16. The control apparatus of claim 15, further comprising:

a second regenerative braking mode signal generated by said controller in response to reception of said plurality of operating parameter signals;

second regenerative braking mode circuitry responsive to said second regenerative braking mode signal to cause said motor to transition from said first regenerative braking mode to a second regenerative braking mode such that said flux continues to charge said D.C. power source while generating a diminishing braking torque, said diminishing braking torque having a maximum magnitude that is less than said constant magnitude of said requested braking torque.

17. The control apparatus of claim 16 wherein said plurality of operating parameter signals include at least one of a decrease motor speed signal, an increase motor speed signal, and a lapse of predetermined time delay signal;

said controller generating said drive mode signal in response to said increase motor speed signal;

said controller generating said transient mode signal in response to said decrease motor speed signal;

said controller generating said first regenerative braking signal in response to one of said lapse of predetermined time delay signal or a reduction in a magnitude of said decrease motor speed signal; and said controller generating said second regenerative braking signal in response to said flux in said armature and said field windings being unable to generate said requested braking torque.

18. The control apparatus of claim 15 wherein said plurality of operating parameter signals include at least one of a decrease motor speed signal, an increase motor speed signal, and a lapse of predetermined time delay signal;

said controller generating said drive mode signal in response to said increase motor speed signal;

said controller generating said transient mode signal in response to said decrease motor speed signal; and said controller generating said first regenerative braking signal in response to one of said lapse of predetermined time delay signal or a reduction in a magnitude of said decrease motor speed signal.

19. The control apparatus of claim 15 wherein said transition from said transient mode to said first regenerative braking mode is substantially instantaneous such that said current flow substantially instantaneously switches from said transient circuit path to said charging circuit path.

20. The control apparatus of claim 16 wherein said transition from said transient mode to said first regenerative braking mode is substantially instantaneous such that said current flow substantially instantaneously switches from said transient circuit path to said charging circuit path.

21. A control apparatus for controlling the regenerative braking of a motor electrically connected to a D.C. power source comprising:

a controller that generates at least one of a drive mode signal, a transient mode signal, a first regenerative braking mode signal, and a second regenerative braking mode signal in response to reception of a plurality of operating parameter signals;

drive mode circuitry responsive to said drive mode signal to cause said motor to operate in a drive mode such that said motor is driven in a first direction of rotation by said D.C. power source;

transient mode circuitry responsive to said transient mode signal to cause said motor to transition from said drive mode to a transient mode such that a flux builds up in an armature winding and a field winding of said motor, said flux generating a current flow through a transient circuit path running through said motor;

first regenerative braking mode circuitry responsive to said first regenerative braking mode signal to cause said motor to transition from said transient mode to a first regenerative braking mode such that said current flow switches from said transient circuit path to a charging circuit path interconnecting said motor and said D.C. power source, said flux charging said D.C. power source and generating a requested braking torque in said motor in a second direction of rotation opposing said first direction of rotation, said braking torque having a constant magnitude; and second regenerative braking mode circuitry responsive to said second regenerative braking mode signal to cause said motor to transition from said first regenerative braking mode to a second regenerative braking mode such that said flux continues to charge said D.C. power source while generating a diminishing braking torque, said diminishing braking torque having a maximum magnitude that is less than said constant magnitude of said requested braking torque.

22. The control apparatus of claim 21 wherein said plurality of operating parameter signals include at least one of a decrease motor speed signal, an increase motor speed signal, and a lapse of predetermined time delay signal;

said controller generating said drive mode signal in response to said increase motor speed signal;

said controller generating said transient mode signal in response to said decrease motor speed signal;

said controller generating said first regenerative braking signal in response to one of said lapse of predetermined time delay signal or a reduction in a magnitude of said decrease motor speed signal; and said controller generating said second regenerative braking signal in response to said flux in said armature and said field windings being unable to generate said requested braking torque.

23. The control apparatus of claim 22 wherein said transition from said transient mode to said first regenerative braking mode is substantially instantaneous such that said current flow substantially instantaneously switches from said transient circuit path to said charging circuit path.

24. The control apparatus of claim 21 wherein said transition from said transient mode to said first regenerative braking mode is substantially instantaneous such that said current flow substantially instantaneously switches from said transient circuit path to said charging circuit path.

* * * * *